United States F

Horimoto

[45] Mar. 1, 1977

4,009,943

[54] FISH EYE LENS SYSTEM

[75] Inventor: Mitsuaki Horimoto, Osaka, Japan

[73] Assignee: Minolta Camera Kabushiki Kaisha, Osaka, Japan

[22] Filed: Aug. 20, 1975

[21] Appl. No.: 606,123

[30] Foreign Application Priority Data

Sept. 5, 1974 Japan .......................... 49-102571

[52] U.S. Cl. .............................. 350/207; 350/214
[51] Int. Cl.² ....................................... G02B 13/04
[58] Field of Search .................... 350/214, 215, 207

[56] References Cited

UNITED STATES PATENTS

| | | | |
|---|---|---|---|
| 3,589,798 | 6/1971 | Ozura | 350/214 |
| 3,741,630 | 6/1973 | Nakazawa | 350/214 |
| 3,850,509 | 11/1974 | Nakazawa | 350/214 |

FOREIGN PATENTS OR APPLICATIONS 47-23576  8/1968  Japan

*Primary Examiner*—John K. Corbin
*Assistant Examiner*—Conrad Clark
*Attorney, Agent, or Firm*—Jackson & Jones Law Corporation

[57] ABSTRACT

An extremely wide angle or fish eye lens system is provided capable of compensating for lateral chromatic aberration, field curvature and astigmatism while providing an aperture ratio of F/4 for use with a compact single lens reflex camera. The fish eye lens system includes a first lens group of four lenses on the object side of a diaphragm and a second lens group of at least three lenses on the image side of the diaphragm. From the object to image side, the first lens group includes a pair of negative lenses, a cemented doublet and a positive fourth lens having a convex surface on the image side adjacent a concave surface of the cemented doublet. The second lens group includes a pair of cemented doublets as two of the three lenses.

18 Claims, 15 Drawing Figures

Spherical Aberration
Sine Condition

Astigmatism

Lateral Chromatic Aberration
g−d

Distortion

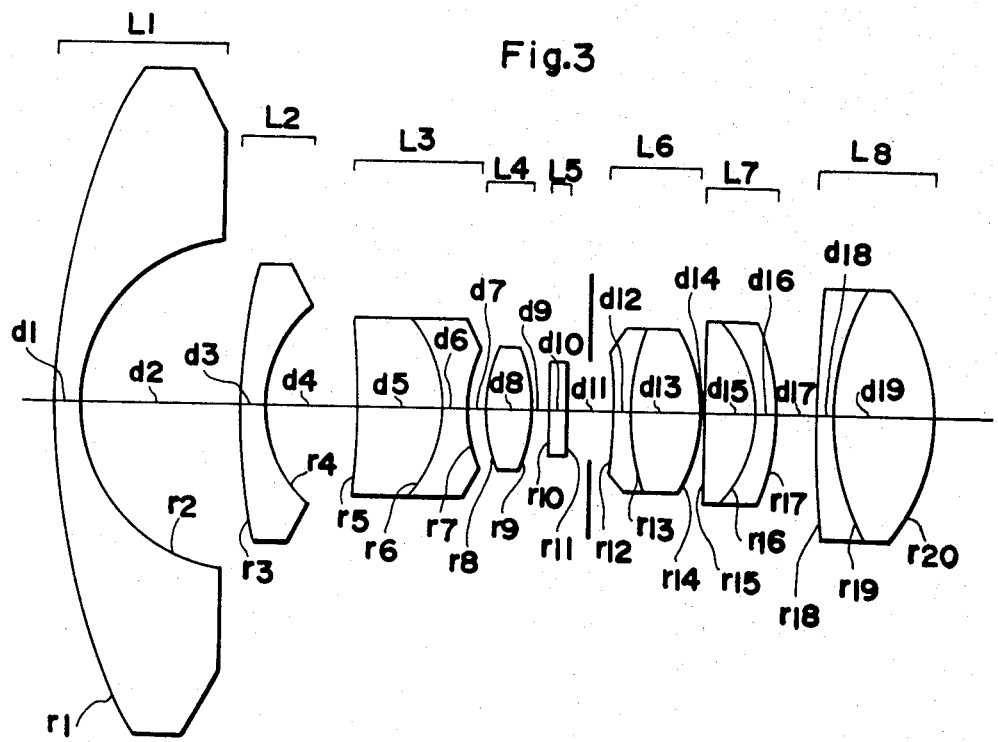
Fig.3
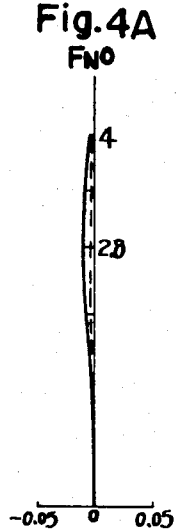
Fig.4A
Spherical Aberration
Sine Condition
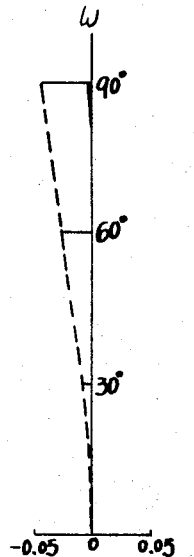
Fig.4B
Astigmatism
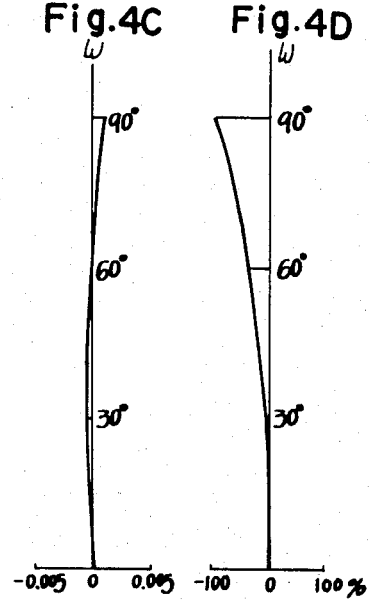
Fig.4C
Lateral Chromatic Aberration
g-d
Fig.4D
Distortion Spherical Aberration
Sine Condition Astigmatism Lateral Chromatic Aberration
g-d Distortion

FISH EYE LENS SYSTEM

BACKGROUND OF THE INVENTION

1. Field of the Invention

The present invention relates to an extremely wide angle photographic lens system and more particularly, to a fish eye lens system having a field angle of 180°.

2. Description of the Prior Art

The advantages of extremely wide angle lens systems, and more particularly, fish eye lens systems are known in the field of photography. A conventional lens system on a camera will normally provide a limited field angle, which in many cases will prove unsatisfactory to the photographer in attempting to capture the true perspective of what the actual object scene would appear to an observer. Conventional camera bodies, such as the now popular SLR, or single lens reflex camera bodies, are generally adapted to provide a flat focal plane coincidental with the film which places limitations on a complimentarily lens system. The difficulties of utilizing a fish eye lens system to provide a 180° field of angle on an SLR camera are considerable.

As can be appreciated, providing an optimum photographically acceptable aperture ratio, is extremely difficult. With the extreme bending of the light rays in a fish eye lens system, there are considerable problems in compensating for lateral chromatic aberrations, not to mention the large curvature of the field. Additionally, a strong residual amount of astigmatism results from the increased diameter of the front lens element in the fish eye lens system. Another problem with 35 mm. SLR cameras is the position of the reflecting mirror, which requires the fish eye lens system to have a relatively long back focal length.

The Ogura U.S. Pat. No. 3,597,049 provides one example of solving the problem associated with a fish eye lens system by controlling the Abbe values of the lens elements. The Japanese Pat. Nos. 47-23576; and 47-35019 issued in 1972 and the Nakagawa U.S. Pat. No. 3,850,509 are additional examples of fish eye lens systems. The Japanese Pat. No. 39-18718 discloses an achromat fish eye lens system.

The Yamashita, et al U.S. Pat. No. 3,870,400; Zimmerman, et al. U.S. Pat. No. 3,132,199; and the Mukai U.S. Pat. No. 2,969,713 are cited of general interest as simply disclosing wide angle lens systems.

The prior art still has not provided an optimum fish eye lens system that is both photographically acceptable and which can be manufactured relatively inexpensively.

SUMMARY OF THE INVENTION

The present invention is adapted for use with a compact SLR camera body and provides a fish eye lens system having an aperture ratio of F/4, a back focal length of approximately 4.8 times the focal length of the total system, while at the same time providing satisfactory compensation for the spherical, and lateral chromatic aberrations and astigmatism resulting from the stringent parameters imposed by a field angle of 180°. The fish eye lens system includes a first lens group on the object side of the diaphragm comprising from object to image side of the total system, a pair of negative meniscus lenses, a negative cemented doublet with a concave surface on the image side, and a positive fourth lens having a convex surface on the object side. The negative doublet concave surface and the positive fourth lens object side surface forming an air space having a positive meniscus shape therebetween. A second lens group is positioned on the image side of the diaphragm and consists of three lenses of which at least two are cemented doublet lenses.

The design parameters of the present fish eye lens system include the following conditions:

$$0.3 < \frac{r_7}{r_8} < 1.0 \tag{1}$$

$$f < |R| < 3.5f \tag{2}$$

$$0.4 > Nn - Np > 0.2 \tag{3}$$

$$3 > \frac{\overline{V}p}{\overline{V}n} > 1.2 \tag{4}$$

wherein $r_7$ and $r_8$ represent respectively, the radii of curvature of the concave surface of the third lens and the object side convex surface of the fourth lens from object to image side of the total lens system; $R$ represents the radius of curvature for each of the intermediate surfaces of the cemented doublets in the second lens group; $\overline{N}p$ represents an average value of the refractive indices for the positive lens components of all the cemented doublets in the second lens group; $\overline{N}n$ represents an average value of the refractive indices for the negative lens components of all the cemented doublets in the second lens group; $\overline{V}p$ represents an average value of the Abbe's Number for the positive lens components of all of the cemented doublets in the second lens group; $\overline{V}n$ represents an average value of the Abbe's Number for all the negative lens components of all of the cemented doublets in the second lens group; and $f$ represents the total focal length of the fish eye lens system.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 3 is a schematic cross-sectional view of a second embodiment of the fish eye lens system of the present invention;

FIGS. 4A through 4D are graphical plots of, respectively, the spherical aberration, astigmatism, lateral chromatic aberration, and distortion for the second embodiment;

BRIEF DESCRIPTION OF THE PREFERRED EMBODIMENT

The following description is provided to enable any person skilled in the optical art to make and use the invention and sets forth the best mode contemplated by the inventor of carrying out his invention. Various modifications, however, will remain readily apparent to those skilled in the art, since the generic principles of the present invention have been defined herein specifically to provide a fish eye lens system that can be manufactured in a relatively economical manner.

The derivation of the formulae and their relation set forth can be accomplished with the assistance of a computer. The present invention represents the parameters of a compromised balance of acceptable aberrations in a relatively easily manufactured and low cost lens system for utilization, for example, with a single lens reflex camera.

For a reference of the techniques of computer design, which are not necessary for either an understanding or the practice of the present invention, the reader is directed to "LENS ABERRATION DATA" by J. M. Palmer, American Elsevier Publishing Company, Inc. 1971, and "OPTIMIZATION TECHNIQUES IN LENS DESIGN" by T. H. Jameison, American Elsevier Publishing Company, Inc. 1971. These references are incorporated herein simply as supplementing and providing background to the present disclosure.

When referring herein to a lens by the symbol, L, it is to be understood, both in the specification and the claims that the symbol is intended to be interpreted broadly enough to cover either a single lens element or an equivalent comprising a group of two or more lens elements such as a doublet.

The fish eye lens system of the present invention provides an optimized commercial lens by the choice of certain parameters set forth herein to solve the problems of spherical and chromatic aberrations, distortion, and astigmatism that is experienced with a field angle of 180°. Each of the embodiments of the present invention provides an aperture ratio of F/4 and a back focal length of approximately 4.8 times the focal length, $f$, of the lens system. Further, each of the embodiments are particularly adapted for use on a compact 35 mm. single lens reflex camera.

Figure 1:
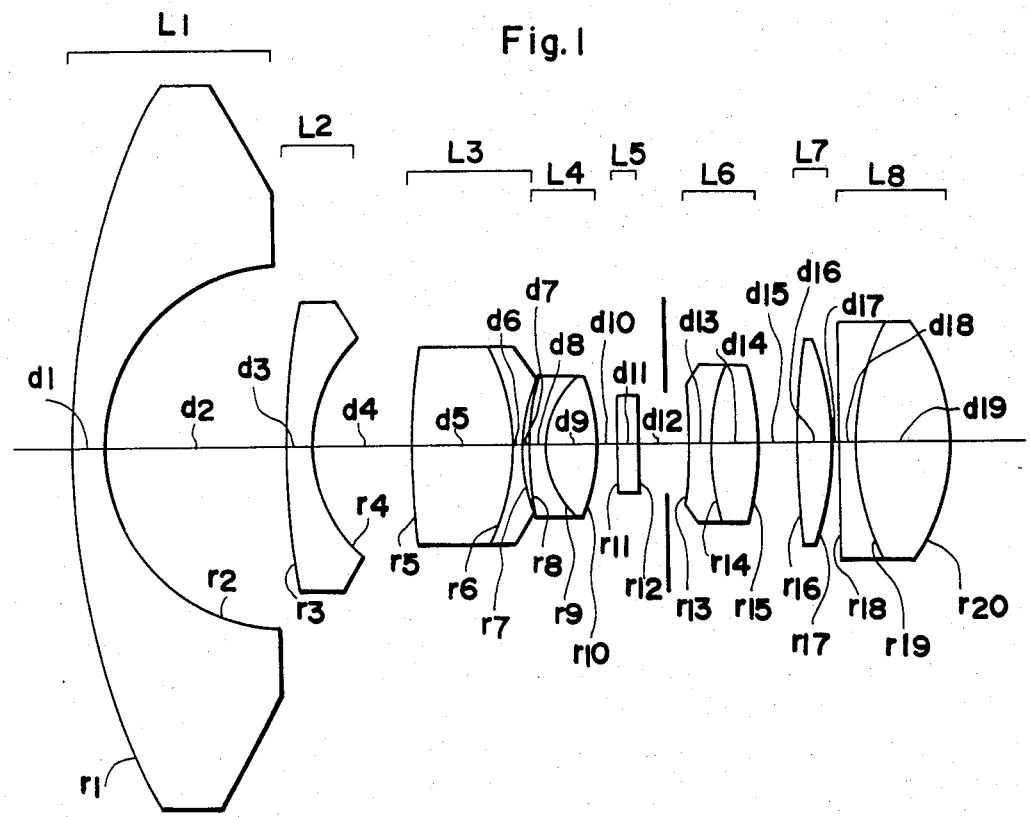
FIG. 1 is a schematic cross-sectional view of a first embodiment of the fish eye lens system of the present invention.
Figure 2A:
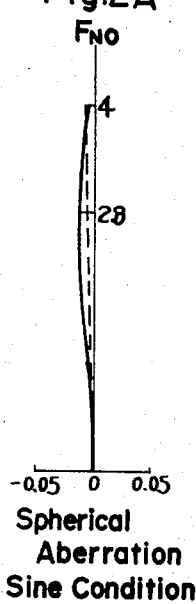
FIGS. 2A through 2D are graphical plots of, respectively, the spherical aberration, astigmatism, lateral chromatic aberration, and distortion for the first embodiment.
Figure 2B:
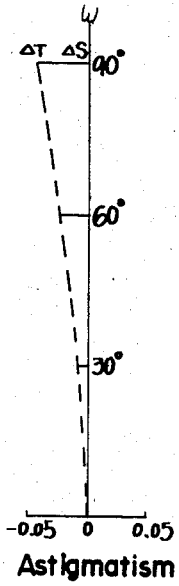
Figure 2C:
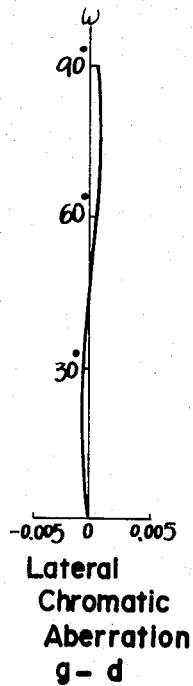
Figure 2D:
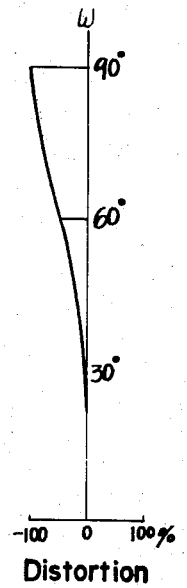
Figure 5:
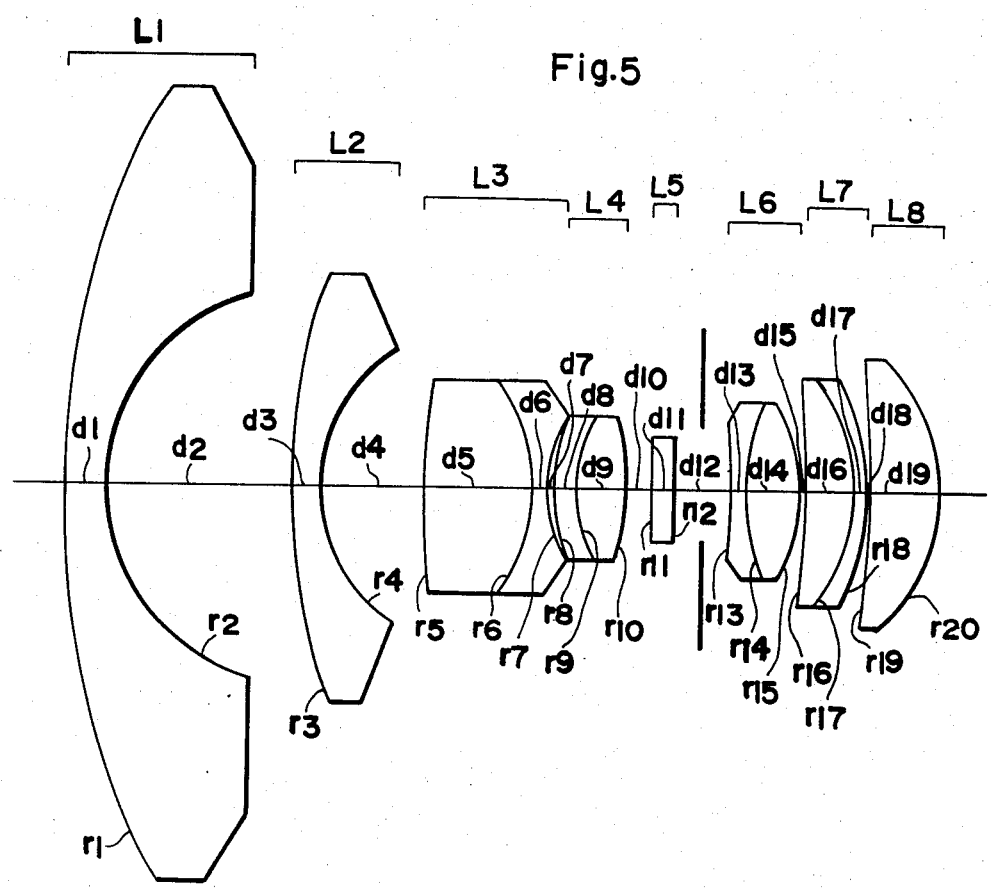
FIG. 5 is a schematic cross-sectional view of a third embodiment of the fish eye lens system of the present invention.
Figure 6A:
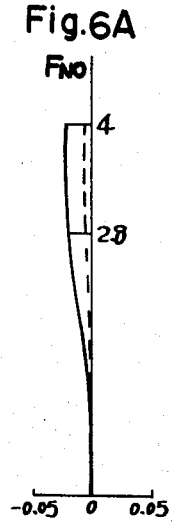
FIGS. 6A through 6D are graphical plots of, respectively, the spherical aberration, astigmatism, lateral chromatic aberration, and distortion for the third embodiment.
Figure 6B:
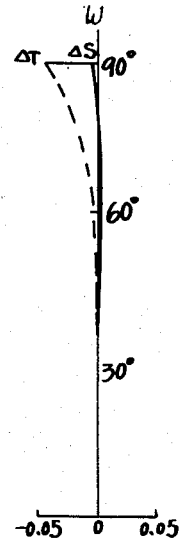
Figure 6C:
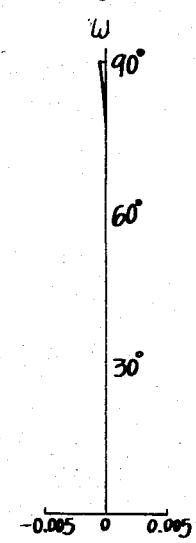
Figure 6D:
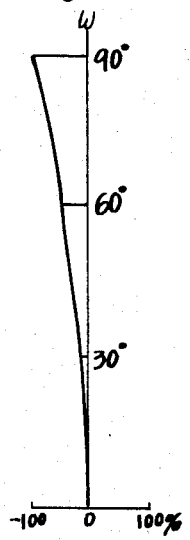

With reference to the schematic cross-sectional views of the embodiments of the present invention in FIGS. 1, 3, and 5, it can be seen that the fish eye lens system includes basically seven lenses plus an additional lens, $L_5$ which is basically a filter that can be optionally changed. The lenses, L, are further designated in groups as a first lens group positioned on the object side of the diaphragm, D, and a second lens group positioned on the image side of the diaphragm. The specific lenses of the present invention, as can be seen in FIGS. 1, 3, and 5, are described from the object to image side of the total fish eye lens system. The first lens group includes a negative meniscus lens, $L_1$, having a concave surface on the front or object side; a second negative meniscus lens, $L_2$, having a concave surface on object side; a doublet, or composite, lens, $L_3$, having a negative refractive power and consisting of respectively, a positive and negative component; and a positive lens, $L_4$, comprising either a single lens, or a composite lens, having respectively, a negative and positive component. A filter, $L_5$, can be positioned before the diaphragm and can be either statically positioned within the fish eye lens system or capable of being optionally changed, as desired.

The second lens group after the diaphragm, includes three lenses, $L_6$, $L_7$, and $L_8$, of which at least two of the lenses will be doublets, or composite, lenses. It is possible for the filter, $L_5$, to be mounted at other locations within the fish eye lens system, such as after the last lens, $L_8$. The design parameters or conditions of the fish eye lens system of the present invention, can be set forth collectively as follows, with the focal length of the total fish eye lens system being $f$;

a. The composite focal length of the negative meniscus lenses, $L_1$, and $L_2$, being in the range of $-f$ to $-2f$.

b. The absolute value of the difference in the Abbe Number (V), for the positive and negative lens components of the doublet lens, $L_3$, being in a range between 15 and 25.

c. The ratio of the radius of curvature of the rear or image surface of $L_3$ to that of the front or object surface of $L_4$ is in the range of 0.3 to 1.0.

d. The absolute value of the radius of curvature of the intermediate surfaces (R) of the composite or doublet lenses in the second lens group, being in the range of $f$ to $3.5f$.

e. The difference of the average value of the refractive indices (N) of the negative lens components and the average value of the refractive indices of the positive lens components of the doublet, or composite, lenses of the second lens group being not less than 0.2 nor more than 0.4.

f. The absolute value obtained by dividing the average value of the Abbe Numbers of the positive lens components of the composite, or doublet, lenses in the second lens group, by the average value of the Abbe's Numbers of the negative lens components in the second lens group will not be less than 1.2 nor more than 3.

The above conditions, or parameters, will set forth the scope of the present invention to those skilled in the optical field. To further facilitate an understanding of the present invention, the following explanation is provided.

Subparagraph (a) above, sets forth the relationship between the focal length of the first and second negative meniscus lens in the first group relative to the total focal length of the fish eye lens system.

The relationship of the focal length is important in achieving an adequately long back focal length, $S'$. The long back focus provides a relatively large free axial spacing between the last surface of the lens system and the image plane, thus accommodating the lens system of the present invention to a pivoted mirror reflex camera. Taking into consideration the negative sign, if the lower design limit, $-2f$ is not maintained, then an excessively short back focal length will result that is unsuitble for a single lens reflex camera and the diameter of the first or front lens element, $L_1$, must be sharply increased to adequately cover a field angle of 180°. If, on the other hand, the upper design limit, $-f$ is not maintained, an adequate back focal length could be achieved but an extremely strong composite refractory power would result in the lens system which would provide excessive compensation of the Petzval sum, despite the availability of providing compensation with the remaining lenses on the image side. Finally, it would not be possible to compensate, within photographic acceptable standards, for astigmatism, coma, and lateral chromatic aberrations.

Condition (b) is necessary for compensating for lateral chromatic aberration. The use of a doublet having components with different Abbe Numbers has been suggested in various forms of retrofocus type lens systems, however, the specific range is considered important in the present fish eye lens system, to compensate for the lateral chromatic aberrations while at the same time exerting an adverse effect on the longitudinal chromatic aberrations. It is further important that the lateral chromatic aberrations and the longitudinal chromatic aberrations be compensated while still maintaining the parameter of subparagraph (a). If the difference in the Abbe's Number exceeds the upper limit of 25, then there will be insufficient compensation for the longitudinal chromatic aberrations and this will result in considerable flare, particularly, at a short wave length. If the difference in the Abbe's Number exceeds the lower limit of 15, then it will not be possible to compensate for the chromatic aberrations in the lens system.

The specific advantages of the present invention can be more readily found in the above subparagraphs (c) through (f) discussed hereafter.

The ratio of the radius of curvature, $r_7$, of the image surface of $L_3$ to that of the object surface, $r_8$, of $L_4$ in subparagraph (c) can be set forth as follows:

$$0.3 < r_7/r_8 < 1.0 \tag{1}$$

By maintaining the radii of lenses $L_3$ and $L_4$ within the range of values of equation (1), it is possible to adequately compensate for spherical aberration. By staying within these range limits, it is possible to provide a minor differential coefficient for the variation in astigmatism and coma, so that in effect, the spherical aberration can be compensated for without impairing any correction of astigmatism and coma. If the ratio, however, exceeds the lower limit, there will be an excessive degree of compensation for spherical aberration; while, if the ratio exceeds the upper limit, there will result an insufficient compensation for the spherical aberration. The present invention prevents an unwieldly increase in size of the fish eye lens system by permitting an increased aperture ratio but still permits compensations for spherical aberration with a relatively compact lens system construction by adhering to the requirements of equation (1). It should be noted that this correction is effectuated despite a relatively large aperture ratio of F/4.

The subparagraphs (d), (e), and (f) provide range limitations in the present invention that must be adhered to in order to compensate for the curvature of field, astigmatism, coma and longitudinal chromatic aberration which are developed in the first lens group.

Subparagraph (d) provides for the absolute value of the radius of curvature $|R|$ of the doublet lenses in the second lens group to be limited as follows:

$$f < |R| < 3.5f. \tag{2}$$

Subparagraph (e) provides for the relationship between the indices of refraction of the negative ($\overline{N}n$) and positive ($\overline{N}p$) lens components of the doublets of the second lens group to be limited as follows:

$$0.4 > \overline{N}n - \overline{N}p > 0.2 \tag{3}$$

While subparagraph (f) provides for the relationship of the Abbe's Number of the negative ($\overline{V}n$) and positive ($\overline{V}p$) lens components of the doublets of the second lens groups to be limited as follows:

$$3 > \frac{\overline{V}p}{\overline{V}n} > 1.2. \tag{4}$$

Each of the equations (2), (3), and (4), set forth an interdependent relationship which permits compensation in the second lens group for the curvature of field, coma, and longitudinal chromatic created in the first lens group. Specifically, equation (2) will prevent an excessive compensation of the Petzval sum which was produced by the first two negative meniscus lens $L_1$ and $L_2$ when combined with equations (3) and (4). Likewise, astigmatism and coma produced in the first lens group will be corrected within the parameters of the equation. The upper limits of equations (3) and (4) are imposed by the refractive index and Abbe's Number for available glass. If the range of values established in equations (2), (3), and (4) are not maintained then there will be an excessive compensation of Petzval sum creating astigmatic problems.

In the accompanying drawing which supplement the following Tables, the lenses in accordance with the present invention, are illustrated diagrammatically using reference characters which have been referred to above. As usual, in conventional lens diagrams, the light is assumed to travel from left to right, the individual lenses are designated by the letter, L, with a subscript indicating the number of the lens as numbered consecutively from object to image side. The diaphragms in the figures are indicated by the letter D. The radii of curvature of the lenses are indicated by, r, with a subscript corresponding to the consecutive numbers of the lens element surfaces.

In the Tables, the minus signs indicate surfaces concave toward the object side, while the surfaces without a sign are convex toward the object side. The Tables also disclose the axial spacings, d, along the optical axis and include both the axial spacings between the lens elements and thickness of the lens elements. The axial spacings between the lens elements are positioned accordingly, relative to the radii in the Tables while the thicknesses are designated accordingly, between the radii. Zero axial spacing indicates lens elements cemented to each other. All other axial spacing greater than zero refer to air spacings.

All linear dimensions are given in absolute values and are given with reference to the equivalent focal length of unit. The Tables also provide with respect to each example, the intended relative aperture, the total angle of view, 2w, and the back focus or back focal length, with reference to an object at infinity.

Referring to FIG. 1, eight lenses, L, including a filter, $L_5$, form one embodiment of the present invention. The first two lenses, $L_1$, and $L_2$, are negative meniscus lenses. The third lens, $L_3$, is a doublet having a negative refractive power while the fourth lens, $L_4$, is a doublet having a positive refractive power. Lenses $L_6$ and $L_8$ are doublets while the single lens $L_7$ has a positive refractive power. The lens parameters of FIG. 1 are set forth in the following Table 1 while the plots of spherical aberration, astigmatism, lateral chromatic aberration and distortion are set forth respectively in FIGS. 2A through 2D.

Table 1

(Example 1)
f = 1  F/4  field angle 2ω = 180°  back focal length s' = 4.8

| Radius of Curvature | Length on Axis | Refractive Index/Abbe's No. |
|---|---|---|
| $L_1$  $r_1 = 7.7292$ | | |
| | $d_1 = 0.3118$ | $N_1/V_1 = 1.6204/60.3$ |
| $r_2 = 1.7383$ | | |
| | $d_2 = 1.8$ | |
| $L_2$  $r_3 = 7.2631$ | | |
| | $d_3 = 0.26$ | $N_2/V_2 = 1.713/53.9$ |
| $r_4 = 1.4224$ | | |
| | $d_4 = 1.0$ | |
| $L_3$  $r_5 = 7.8541$ | | |
| | $d_5 = 1.0$ | $N_3/V_3 = 1.5934/34.8$ |
| $r_6 = -2.0214$ | | |
| | $d_6 = 0.14$ | $N_4/V_4 = 1.72/50.2$ |
| $r_7 = 1.7706$ | | |
| | $d_7 = 0.0543$ | |
| $L_4$  $r_8 = 3.1335$ | | |
| | $d_8 = 0.14$ | $N_5/V_5 = 1.5890/53.3$ |
| $r_9 = 0.9291$ | | |
| | $d_9 = 0.5$ | $N_6/V_6 = 1.5955/39.4$ |
| $r_{10} = -1.8444$ | | |
| | $d_{10} = 0.2$ | |
| $L_5$  $r_{11} = \infty$ | | |
| | $d_{11} = 0.2$ | $N_7/V_7 = 1.5186/60.1$ |
| $r_{12} = \infty$ | | |
| | $d_{12} = 0.5553$ | |
| $L_6$  $r_{13} = -5.3273$ | | |
| | $d_{13} = 0.16$ | $N_8/V_8 = 1.883/41.0$ |
| $r_{14} = 2.0792$ | | |
| | $d_{14} = 0.5175$ | $N_9/V_9 = 1.5112/51.0$ |
| $r_{15} = -2.1953$ | | |
| | $d_{15} = 0.3823$ | |
| $L_7$  $r_{16} = 6.1293$ | | |
| | $d_{16} = 0.3620$ | $N_{10}/V_{10} = 1.4645/65.9$ |
| $r_{17} = -3.3580$ | | |
| | $d_{17} = 0.0484$ | |
| $L_8$  $r_{18} = -167.48$ | | |
| | $d_{18} = 0.2$ | $N_{11}/V_{11} = 1.7847/25.7$ |
| $r_{19} = 2.5280$ | | |
| | $d_{19} = 0.9$ | $N_{12}/V_{12} = 1.4787/58.7$ |
| $r_{20} = -1.9638$ | | |

Referring to FIG. 3, a second embodiment of the present invention is provided wherein the fourth lens, $L_4$, is a single lens and each of the lenses, $L_6$, $L_7$, and $L_8$, of the second lens group are doublets. The lens parameters are set forth in the following Table 2, while the plots of spherical aberration, astigmatism, lateral chromatic aberration and distortion are set forth respectively in FIGS. 4A through 4D.

Table 2

(Example 2)
f = 1  F/4  field angle 2ω = 180°  back focal length s' = 4.82

| Radius of Curvature | Length on Axis | Refractive Index/Abbe's No. |
|---|---|---|
| $L_1$  $r_1 = 7.4785$ | | |
| | $d_1 = 0.3004$ | $N_1/V_1 = 1.6204/60.3$ |
| $r_2 = 1.8231$ | | |
| | $d_2 = 1.8$ | |
| $L_2$  $r_3 = 6.8587$ | | |
| | $d_3 = 0.26$ | $N_2/V_2 = 1.713/53.9$ |
| $r_4 = 1.5187$ | | |
| | $d_4 = 1.0$ | |
| $L_3$  $r_5 = -73.948$ | | |
| | $d_5 = 1.0$ | $N_3/V_3 = 1.5934/34.8$ |
| $r_6 = -1.3792$ | | |
| | $d_6 = 0.3$ | $N_4/V_4 = 1.713/54.0$ |
| $r_7 = 1.8650$ | | |
| | $d_7 = 0.1885$ | |
| $L_4$  $r_8 = 2.4160$ | | |
| | $d_8 = 0.4757$ | $N_5/V_5 = 1.5934/34.8$ |
| $r_9 = -2.1856$ | | |
| | $d_9 = 0.2$ | |
| $L_5$  $r_{10} = \infty$ | | |
| | $d_{10} = 0.2$ | $N_6/V_6 = 1.5186/60.1$ |
| $r_{11} = \infty$ | | |
| | $d_{11} = 0.5553$ | |
| $L_6$  $r_{12} = -6.5665$ | | |
| | $d_{12} = 0.16$ | $N_7/V_7 = 1.805/41.0$ |
| $r_{13} = 2.2723$ | | |
| | $d_{13} = 0.8103$ | $N_8/V_8 = 1.5317/48.9$ |
| $r_{14} = -1.9740$ | | |
| | $d_{14} = 0.02$ | |
| $L_7$  $r_{15} = -86.755$ | | |
| | $d_{15} = 0.6010$ | $N_9/V_9 = 1.4645/65.9$ |
| $r_{16} = -1.4083$ | | |
| | $d_{16} = 0.2$ | $N_{10}/V_{10} = 1.7847/25.7$ |
| $r_{17} = -2.8362$ | | |
| | $d_{17} = 0.5$ | |
| $L_8$  $r_{18} = 21.540$ | | |
| | $d_{18} = 0.15$ | $N_{11}/V_{11} = 1.717/47.9$ |
| $r_{19} = 2.8369$ | | |
| | $d_{19} = 1.14$ | $N_{12}/V_{12} = 1.4707/67.4$ |
| $r_{20} = -2.1988$ | | |

Referring to FIG. 5, a third embodiment of the present invention is provided wherein the fourth lens, $L_4$, is a doublet and lenses, $L_6$, and $L_7$, are also doublets. A single positive refractive power lens, is provided as the eighth lens, $L_8$. The lens parameters of FIG. 5 are set forth in the following Table 3, while the plots of spherical aberration, astigmatism, lateral chromatic aberration and distortion are set forth respectively in FIGS. 6A through 6D.

Table 3

(Example 3)
f = 1  F/4  field angle 2ω = 180°  back focal length s' = 4.82

| Radius of Curvature | Length on Axis | Refractive Index/Abbe's No. |
|---|---|---|
| $L_1$  $r_1 = 8.1544$ | | |
| | $d_1 = 0.3118$ | $N_1/V_1 = 1.6204/60.3$ |
| $r_2 = 1.8622$ | | |
| | $d_2 = 1.8$ | |
| $L_2$  $r_3 = 5.7353$ | | |
| | $d_3 = 0.26$ | $N_2/V_2 = 1.713/53.9$ |
| $r_4 = 1.5695$ | | |
| | $d_4 = 1.0$ | |
| $L_3$  $r_5 = 8.2532$ | | |
| | $d_5 = 1.0$ | $N_3/V_3 = 1.5934/34.8$ |
| $r_6 = -1.6162$ | | |
| | $d_6 = 0.14$ | $N_4/V_4 = 1.713/54.0$ |
| $r_7 = 1.4885$ | | |
| | $d_7 = 0.0987$ | |
| $L_4$  $r_8 = 2.9475$ | | |
| | $d_8 = 0.14$ | $N_5/V_5 = 1.5891/61.1$ |
| $r_9 = 1.1328$ | | |
| | $d_9 = 0.5$ | $N_6/V_6 = 1.5934/34.8$ |
| $r_{10} = -1.9985$ | | |
| | $d_{10} = 0.2$ | |
| $L_5$  $r_{11} = \infty$ | | |
| | $d_{11} = 0.2$ | $N_7/V_7 = 1.5186/60.1$ |
| $r_{12} = \infty$ | | |
| | $d_{12} = 0.5553$ | |

Table 3-continued

(Example 3)
f = 1 F/4 field angle 2ω = 180° back focal length s' = 4.82

| Radius of Curvature | Length on Axis | Refractive Index/ Abbe's No. |
|---|---|---|
| $r_{13} = -9.3305$ | | |
| | $d_{13} = 0.16$ | $N_8/V_8 = 1.8835/40.3$ |
| $L_6$ $r_{14} = 1.8266$ | | |
| | $d_{14} = 0.4907$ | $N_9/V_9 = 1.4875/70.1$ |
| $r_{15} = -1.7044$ | | |
| | $d_{15} = 0.02$ | |
| $r_{16} = -8.9482$ | | |
| | $d_{16} = 0.4342$ | $N_{10}/V_{10} = 1.4875/70.1$ |
| $L_7$ $r_{17} = -1.5068$ | | |
| | $d_{17} = 0.1069$ | $N_{11}/V_{11} = 1.7847/25.7$ |
| $r_{18} = -2.7001$ | | |
| | $d_{18} = 0.0430$ | |
| $r_{19} = -12.428$ | | |
| $L_8$ | $d_{19} = 0.7058$ | $N_{12}/V_{12} = 1.4645/65.9$ |
| $r_{20} = -1.6775$ | | |

As can be readily appreciated, it is possible to deviate from the above embodiments of the present invention and as will be readily understood by those skilled in the art, the invention is capable of many modifications and improvements within the scope and spirit thereof. Accordingly, it will be understood that the invention is not to be limited by the specific disclosed embodiments but only by the scope and spirit of the appended claims.

What is claimed is:

1. A fish eye lens system having a diaphragm on its optical axis and an object and image side to the lens system comprising:
   a first lens group positioned on the object side of the diaphragm including a first negative meniscus lens having a convex surface on the object side, a second negative meniscus lens having a convex surface on the object side, a third negative doublet lens having a concave surface on the image side and a fourth positive lens having a convex surface on the object side, the concave surface of the third lens and the convex surface of the fourth lens forming a space of positive meniscus shape therebetween; and
   a second lens group positioned on the image side of the diaphragm including at least three lenses of which two of the lenses are doublets composed of positive and negative components.

2. A lens system as defined in claim 1 further including a filter member movable between two positions on and off the optical axis of the lens system.

3. A lens system as defined in claim 1 wherein the fourth lens is a cemented doublet.

4. A lens system as defined in claim 1 wherein the fifth and seventh lenses are cemented doublets.

5. A lens system as defined in claim 1 wherein the fifth, sixth and seventh lenses are cemented doublets.

6. A lens system as defined in claim 1 wherein the fifth and sixth lenses are cemented doublets.

7. A lens system as defined in claim 1 having design parameters within the following ranges:

$$0.3 < \frac{r_7}{r_8} < 1.0 \tag{1}$$

$$f < |R| < 3.5f \tag{2}$$

$$0.4 > \overline{N}n - \overline{N}p > 0.2 \tag{3}$$

$$3 > \frac{\overline{V}p}{\overline{V}n} > 1.2 \tag{4}$$

wherein $r_7$ and $r_8$ represent respectively the radii of curvature of the concave surface of the third lens and convex surface of the fourth lens, R represents the radii of curvature for the intermediate surfaces of all of the cemented doublets in the second lens group, $\overline{N}p$ represents the average refractive index for all the positive components of all of the cemented doublets in the second lens group, $\overline{N}n$ represents the average refractive index for all the negative components of all of the cemented doublets in the second lens group, $\overline{V}p$ represents an average Abbe's Number for all the positive components of all of the cemented doublets in the second lens group, $\overline{V}n$ represents an average Abbe's Number for all the negative components of all of the cemented doublets in the second lens group, and $f$ represents the total focal length of the lens system.

8. A lens system as defined in claim 1 having design parameters within the following ranges:

$$0.3 < \frac{r_7}{r_8} < 1.0$$

wherein $r_7$ and $r_8$ represent respectively the radii of curvature of said concave surface of the third lens and said convex surface of the fourth lens.

9. A lens system as defined in claim 1 having design parameters within the following ranges:

$$f < |R| < 3.5f \tag{1}$$

$$0.4 > \overline{N}n - \overline{N}p > 0.2 \tag{2}$$

$$3 > \frac{\overline{V}p}{\overline{V}n} > 1.2 \tag{3}$$

wherein R represents the radii of curvature for the intermediate surfaces of all of the cemented doublets in the second lens group, $\overline{N}p$ represents the average refractive index for all the positive components of all of the cemented doublets in the second lens group, $\overline{N}n$ represents the refractive index for all the negative components of all of the cemented doublets in the second lens group, $\overline{V}p$ represents an average Abbe's Number for all the positive components of all of the cemented doublets in the second lens group, $\overline{V}n$ represents an average Abbe's Number for all the negative components of all of the cemented doublets in the second lens group and $f$ represents the total focal length of the lens system.

10. In a fish eye lens system having a field angle of approximately 180°, the improvement comprising: a first lens group having at least three negative lenses and a fourth positive lens; a second lens group including at least a pair of doublets with positive and negative components, and a diaphragm positioned between the first and second lens groups, the lens system complying with the following parameters:

$$f < |R| < 3.5f \tag{1}$$

$$0.4 > \overline{N}n - \overline{N}p > 0.2 \tag{2}$$

$$3 > \frac{\overline{V}p}{\overline{V}n} > 1.2 \quad (3)$$

wherein R represents the radii of curvature for the intermediate surfaces of all of the cemented doublets in the second lens group, $\overline{N}p$ represents the average refractive index for all the positive components of all of the cemented doublets in the second lens group, $\overline{N}n$ represents the average refractive index for all of the negative components of all of the cemented doublets in the second lens group, $\overline{V}p$ represents an average Abbe's Number for all the positive components of all of the cemented doublets in the second lens group, $\overline{V}n$ represents an average Abbe's Number for all the negative components of all of the cemented doublets in the second lens group and $f$ represents the total focal length of the lens system.

11. The invention of claim 10 further including an additional design parameter, as follows;

$$0.3 < \frac{r_7}{r_8} < 1.0 \quad (4)$$

wherein $r_7$ and $r_8$ represent respectively, the radii of curvature of the concave surface of the third lens of and the convex surface of the fourth lens in the first lens group.

12. The invention of claim 11 the fourth lens of the first group is a doublet.

13. The invention of claim 11 wherein the second lens group includes three lenses and the fifth and seventh lenses are doublets.

14. The invention of claim 11 wherein the second lens group includes three lenses and the fifth, sixth and seventh lenses are doublets.

15. The invention of claim 11 wherein the second lens groups includes three lenses and the fifth and sixth lenses are doublets.

16. A fish eye lens system comprising the following design parameters:

| $f = 1$ F/4 field angle $2\omega = 180°$ back focal length $s' = 4.8$ | | |
|---|---|---|
| Radius of Curvature | Length on Axis | Refractive Index/ Abbe's No. |
| $r_1 = 7.7292$ | | |
| $L_1$ | $d_1 = 0.3118$ | $N_1/V_1 = 1.6204/60.3$ |
| $r_2 = 1.7383$ | | |
| | $d_2 = 1.8$ | |
| $r_3 = 7.2631$ | | |
| $L_2$ | $d_3 = 0.26$ | $N_2/V_2 = 1.713/53.9$ |
| $r_4 = 1.4224$ | | |
| | $d_4 = 1.0$ | |
| $r_5 = 7.8541$ | | |
| | $d_5 = 1.0$ | $N_3/V_3 = 1.5934/34.8$ |
| $L_3$ $r_6 = -2.0214$ | | |
| | $d_6 = 0.14$ | $N_4/V_4 = 1.72/50.2$ |
| $r_7 = 1.7706$ | | |
| | $d_7 = 0.0543$ | |
| $r_8 = 3.1335$ | | |
| | $d_8 = 0.14$ | $N_5/V_5 = 1.5890/53.3$ |
| $L_4$ $r_9 = 0.9291$ | | |
| | $d_9 = 0.5$ | $N_6/V_6 = 1.5955/39.4$ |
| $r_{10} = -1.8444$ | | |
| | $d_{10} = 0.2$ | |
| $r_{11} = \infty$ | | |
| $L_5$ | $d_{11} = 0.2$ | $N_7/V_7 = 1.5186/60.1$ |
| $r_{12} = \infty$ | | |
| $r_{13} = -5.3273$ | | |
| | $d_{12} = 0.5553$ | |
| | $d_{13} = 0.16$ | $N_8/V_8 = 1.883/41.0$ |
| $L_6$ $r_{14} = 2.0792$ | | |
| | $d_{14} = 0.5175$ | $N_9/V_9 = 1.5112/51.0$ |
| $r_{15} = -2.1953$ | | |
| | $d_{15} = 0.3823$ | |
| $r_{16} = 6.1293$ | | |
| $L_7$ | $d_{16} = 0.3620$ | $N_{10}/V_{10} = 1.4645/65.9$ |
| $r_{17} = -3.3580$ | | |
| | $d_{17} = 0.0484$ | |
| $r_{18} = -167.48$ | | |
| | $d_{18} = 0.2$ | $N_{11}/V_{11} = 1.7847/25.7$ |
| $L_8$ $r_{19} = 2.5280$ | | |
| | $d_{19} = 0.9$ | $N_{12}/V_{12} = 1.4787/58.7$ |
| $r_{20} = -1.9638$ | | |

17. A fish eye lens system comprising the following design parameters:

| $f = 1$ F/4 field angle $2\omega = 180°$ back focal length $s' = 4.82$ | | |
|---|---|---|
| Radius of Curvature | Length on Axis | Refractive Index/ Abbe's No. |
| $r_1 = 7.4785$ | | |
| $L_1$ | $d_1 = 0.3004$ | $N_1/V_1 = 1.6204/60.3$ |
| $r_2 = 1.8231$ | | |
| | $d_2 = 1.8$ | |
| $r_3 = 6.8587$ | | |
| $L_2$ | $d_3 = 0.26$ | $N_2/V_2 = 1.713/53.9$ |
| $r_4 = 1.5187$ | | |
| | $d_4 = 1.0$ | |
| $r_5 = -73.948$ | | |
| | $d_5 = 1.0$ | $N_3/V_3 = 1.5934/34.8$ |
| $L_3$ $r_6 = -1.3792$ | | |
| | $d_6 = 0.3$ | $N_4/V_4 = 1.713/54.0$ |
| $r_7 = 1.8650$ | | |
| | $d_7 = 0.1885$ | |
| $r_8 = 2.4160$ | | |
| $L_4$ | $d_8 = 0.4757$ | $N_5/V_5 = 1.5934/34.8$ |
| $r_9 = -2.1856$ | | |
| | $d_9 = 0.2$ | |
| $r_{10} = \infty$ | | |
| $L_5$ | $d_{10} = 0.2$ | $N_6/V_6 = 1.5186/60.1$ |
| $r_{11} = \infty$ | | |
| | $d_{11} = 0.5553$ | |
| $r_{12} = -6.5665$ | | |
| | $d_{12} = 0.16$ | $N_7/V_7 = 1.805/41.0$ |
| $L_6$ $r_{13} = 2.2723$ | | |
| | $d_{13} = 0.8103$ | $N_8/V_8 = 1.5317/48.9$ |
| $r_{14} = -1.9740$ | | |
| | $d_{14} = 0.02$ | |
| $r_{15} = -86.755$ | | |
| | $d_{15} = 0.6010$ | $N_9/V_9 = 1.4645/65.9$ |
| $L_7$ $r_{16} = -1.4083$ | | |
| | $d_{16} = 0.2$ | $N_{10}/V_{10} = 1.7847/25.7$ |
| $r_{17} = -2.8362$ | | |
| | $d_{17} = 0.5$ | |
| $r_{18} = 21.540$ | | |
| | $d_{18} = 0.15$ | $N_{11}/V_{11} = 1.717/47.9$ |
| $L_8$ $r_{19} = 2.8369$ | | |
| | $d_{19} = 1.14$ | $N_{12}/V_{12} = 1.4707/67.4$ |
| $r_{20} = -2.1988$ | | |

18. A fish eye lens system comprising the following design parameters:

| | f = 1 F/4 field angle 2ω = 180° back focal length s' = 4.82 | | |
|---|---|---|---|
| Radius of Curvature | | Length on Axis | Refractive Index/ Abbe's No. |
| L$_1$ | r$_1$ = 8.1544 | d$_1$ = 0.3118 | N$_1$/V$_1$ = 1.6204/60.3 |
| | r$_2$ = 1.8622 | | |
| | | d$_2$ = 1.8 | |
| L$_2$ | r$_3$ = 5.7353 | d$_3$ = 0.26 | N$_2$/V$_2$ = 1.713/53.9 |
| | r$_4$ = 1.5695 | | |
| | | d$_4$ = 1.0 | |
| L$_3$ | r$_5$ = 8.2532 | d$_5$ = 1.0 | N$_3$/V$_3$ = 1.5934/34.8 |
| | r$_6$ = −1.6162 | d$_6$ = 0.14 | N$_4$/V$_4$ = 1.713/54.0 |
| | r$_7$ = 1.4885 | | |
| | | d$_7$ = 0.0987 | |

-continued

| | f = 1 F/4 field angle 2ω = 180° back focal length s' = 4.82 | | |
|---|---|---|---|
| Radius of Curvature | | Length on Axis | Refractive Index/ Abbe's No. |
| L$_4$ | r$_8$ = 2.9475 | d$_8$ = 0.14 | N$_5$/V$_5$ = 1.5891/61.1 |
| | r$_9$ = 1.1328 | d$_9$ = 0.5 | N$_6$/V$_6$ = 1.5934/34.8 |
| | r$_{10}$ = −1.9985 | | |
| | | d$_{10}$ = 0.2 | |
| L$_5$ | r$_{11}$ = ∞ | d$_{11}$ = 0.2 | N$_7$/V$_7$ = 1.5186/60.1 |
| | r$_{12}$ = ∞ | | |
| | | d$_{12}$ = 0.5553 | |
| L$_6$ | r$_{13}$ = −9.3305 | d$_{13}$ = 0.16 | N$_8$/V$_8$ = 1.8835/40.3 |
| | r$_{14}$ = 1.8266 | d$_{14}$ = 0.4907 | N$_9$/V$_9$ = 1.4875/70.1 |
| | r$_{15}$ = −1.7044 | | |
| | | d$_{15}$ = 0.02 | |
| L$_7$ | r$_{16}$ = −8.9482 | d$_{16}$ = 0.4342 | N$_{10}$/V$_{10}$ = 1.4875/70.1 |
| | r$_{17}$ = −1.5068 | d$_{17}$ = 0.1069 | N$_{11}$/V$_{11}$ = 1.7847/25.7 |
| | r$_{18}$ = −2.7001 | | |
| | | d$_{18}$ = 0.0430 | |
| L$_8$ | r$_{19}$ = −12.428 | d$_{19}$ = 0.7058 | N$_{12}$/V$_{12}$ = 1.4645/65.9 |
| | r$_{20}$ = −1.6775 | | |

\* \* \* \* \*